June 2, 1936.  C. W. DAKE ET AL  2,042,701
METHOD OF MAKING FLANGED BRAKE DRUMS
Filed April 8, 1935  2 Sheets-Sheet 1
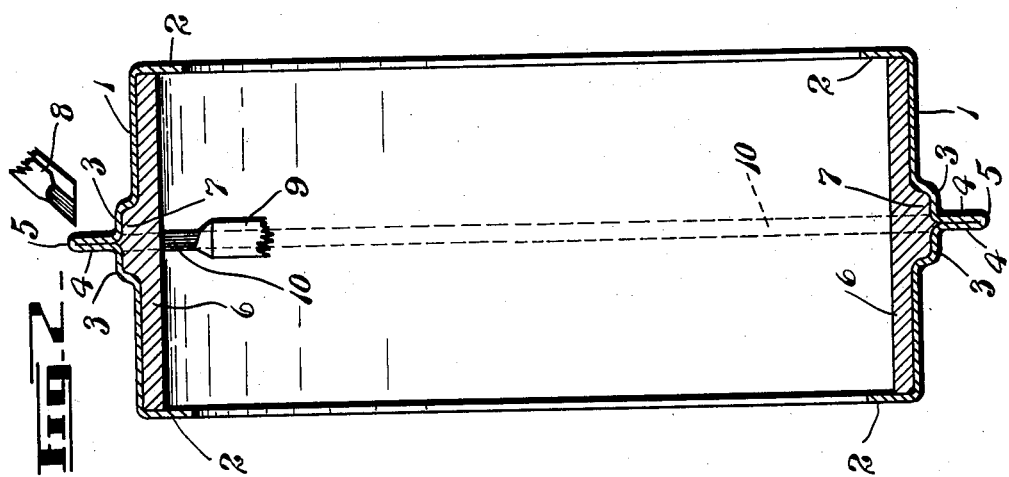
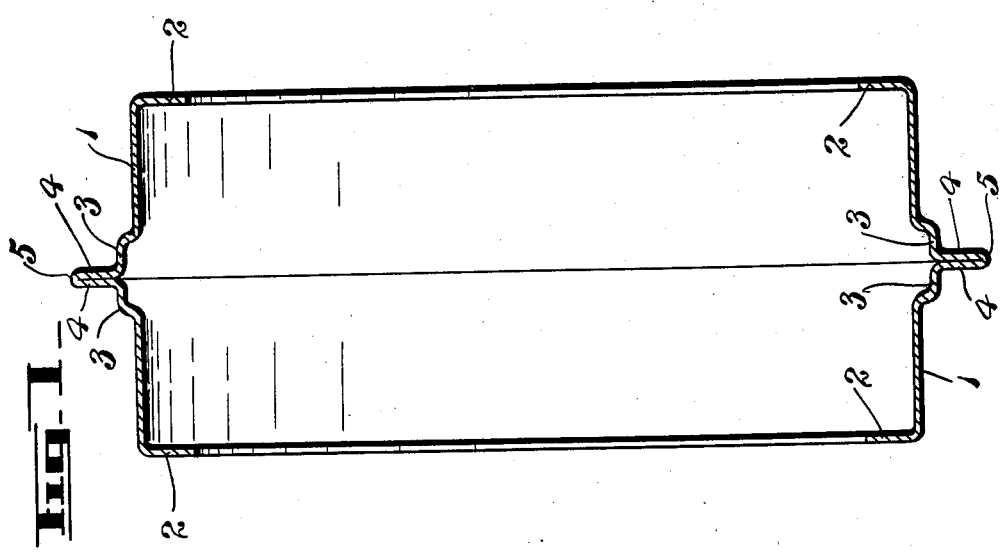
INVENTORS
Charles W. Dake
Raymond K. Johnson
BY Liverance and Van Antwerp
ATTORNEYS June 2, 1936.  C. W. DAKE ET AL  2,042,701
METHOD OF MAKING FLANGED BRAKE DRUMS
Filed April 8, 1935  2 Sheets-Sheet 2
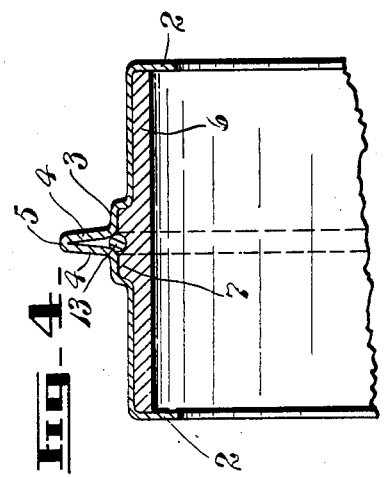
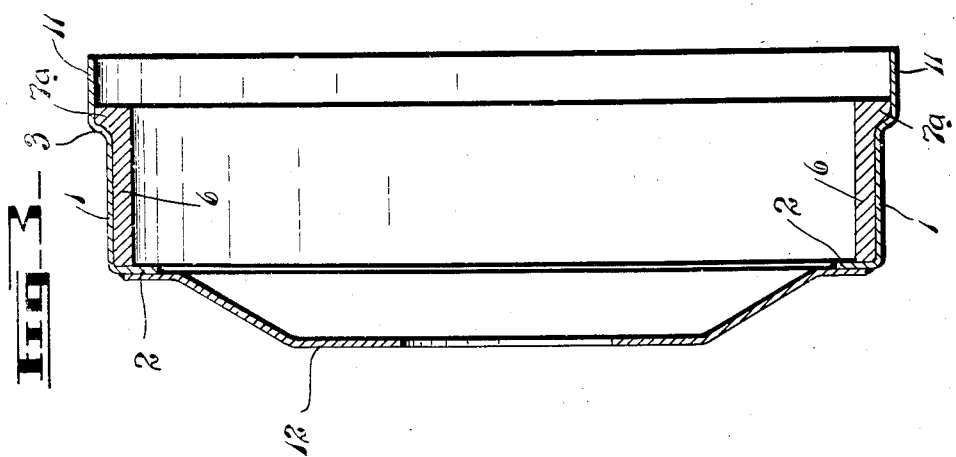
INVENTORS
Charles W. Dake
Raymond K. Johnson
BY Liverance and Van Antwerp
ATTORNEYS Patented June 2, 1936

2,042,701

UNITED STATES PATENT OFFICE 2,042,701

METHOD OF MAKING FLANGED BRAKE DRUMS

Charles W. Dake, Grand Haven, and Raymond K. Johnson, Muskegon, Mich., assignors to Campbell, Wyant & Cannon Foundry Company, Muskegon, Mich., a corporation of Michigan Application April 8, 1935, Serial No. 15,162

10 Claims. (Cl. 29—152.2)

This invention relates to brake drums and more particularly to a novel method of making the same. It is a primary object and purpose of the present invention to produce a so-called composite brake drum, that is, one having an outside wrought metal supporting cylindrical shell or flange lined with an inner lining of cast metal, with a shield extension to the wrought metal shell beyond the cast metal liner. It is very desirable that such extension to the wrought metal shell beyond the end of the cast metal liner be provided for the purpose of shielding the inner wearing or braking surface of the brake drum and also the brake shoes which operate thereagainst from dust, dirt, water and the like. Such shielding or protecting of the drum and brake shoes adds to the life of both through the elimination of abrasion, cutting or scoring which may follow from the introduction of dust, dirt, water or the like between the brake shoes and the brake drum.

With our invention there is produced, in a simple, practical and economical manner, brake drums having the shields described and without the waste of a considerable percentage of cast metal, and with the use of substantially only enough cast metal to form the immediate wearing or braking part of a brake drum. The invention and the advantages secured thereby may be understood from the following description, taken in connection with the accompanying drawings, in which, Fig. 1 is a longitudinal vertical section through a double width brake drum wrought shell formed in accordance with our invention.

Fig. 2 is a similar section showing the same lined with the cast metal liner and ready to be divided to make two brake drum flanges.

Fig. 3 is a central vertical section through a completed brake drum, and

Fig. 4 is an alternative structure to that illustrated in Fig. 2.

Like reference characters refer to like parts in the different figures of the drawings.

The shell 1, which is preferably of a low carbon steel, may be formed in any suitable manner but in practice is rolled into cylindrical form from a single length of sheet steel and the ends welded together to make the cylinder 1. The ends of the cylinder are turned inwardly to provide continuous inwardly extending annular flanges 2. Substantially midway between the ends of the cylinder the metal is pressed outwardly for a short distance to make the annular enlargements at 3 and is then formed into a continuous annular outwardly extending rib having two sides 4 connected at their outer ends by an integral bend 5.

The steel shell is heated to substantially 1500° F. and rotated rapidly about its longitudinal axis and, while rotating, molten iron at a temperature usually between a lower limit of 2750° F. and a higher limit of 3000° F. is deposited in the shell. Through centrifugal action the molten iron is spread continuously and evenly over the entire inner peripheral surface of the shell between the retaining flanges 2. Said molten iron upon solidifying becomes a cast iron lining 6 which is joined inseparably by a fusion connection to and susbtantially entirely over the inner peripheral surfaces of the shell at all places where the iron contact therewith. The liner is necessarily slightly thicker, as at 7, where the shell was outwardly pressed or rolled to make the annular enlargements 3.

When the composite structure as described has been made, the succeeding step of operation is to divide the shell into two parts by cutting the same midway between its ends. A cutting tool 8 may be used to cut away the bend at 5 thus breaking the connection between the two sides 4 of the annular rib which extends outwardly from the shell 1. A cutting tool or its equivalent 9 divides the cast metal liner by cutting a groove 10 outwardly from the inner side of the liner 6 to the steel shell. The parts 4, which after the dividing has been done, extend radially outward, are then bent back to form, each an extension 11 (Fig. 3) which is in alinement with the immediately adjacent portions of the steel shell and which extend a distance beyond the end of the liner 6, equal to the length of the parts 4. The extension 11 is for the purpose of shielding the braking surface of the drum and also the brake shoes which operate thereagainst from dust, dirt and water. The brake drum is completed by providing a back or web 12 which is permanently secured by a welding or other equivalent permanent fastening to the flange 2, one of which flanges remains with each of the two parts into which the composite structure shown in Fig. 2 is divided.

In Fig. 4 a slight modification is shown in that, instead of the parts 4 of the outwardly extending annular rib coming into contact engagement with each other at their adjacent sides, said sides 4 diverge somewhat from each other inwardly toward the shell, and a continuous length of wire 13 is located so as to cover the open side of the groove made by such diverging. The lining of this shell with the iron 6 is performed in the same manner, covering the wire 3. When the shell is divided the wire separates, such part as is not cut away by the tool 9, and there is left the two brake parts each with an outwardly extending substantially radially positioned flange 4 which is bent back into a position like that occupied by the shield 11 in Fig. 3, thus providing the desired shield element to extend beyond the adjacent ends of the liner 6.

The length of the extension of the shield 11 beyond the liner 6 may be controlled by the distance upward that the rib is formed in the shell and also by the amount which is removed at the outer end of said rib by the cutting tool 8. The shell at the bends between the parts 3 and 4 is annealed and softened by the heat from the molten metal so that the parts 4 may be bent or rolled or otherwise made to occupy the position and perform the office of the shield 11 without disrupting or breaking the material from which the shell is made.

The method of forming a brake composite drum described is practical and efficient and is very economical in that there is no need to use an excess of molten iron which later has to be machined away and lost as waste and which would have to be done if no rib, such as shown by the parts 4 connected by the bend 5, was provided but, instead, the shell was increased in length the amount required to provide the shields and the whole covered with molten iron, and then the cast iron cut back from the outer edge of the shield the required distance. This results in a saving of substantially 15% in the molten iron used and which in large quantity production amounts to a daily saving of the many tons of molten iron.

The invention is defined in the appended claims and is not to be limited otherwise than as necessitated by the terms of the claims.

We claim:

1. The method of making a brake drum part which consists in providing a substantially cylindrical wrought metal shell with an inturned annular flange at one end and an outturned annular flange spaced therefrom, shielding the side of the outturned flange which is adjoined to the inner side of the shell, casting a cast iron cylindrical liner at the inner side of said shell between the inner side of the inwardly extending flange and the plane of the outwardly extending flange, and then shaping said outwardly extending flange into substantially cylindrical form to provide a continuation of said cylindrical shell beyond said cast metal liner therein.

2. The herein described method which consists in providing a wrought metal cylindrical shell having an outwardly extending continuous annular flange spaced from one end, shielding the outer side of the outturned flange, casting a lining of cast metal against the inner cylindrical surface of said shell, removing the shielding means and shaping said flange into cylindrical form to provide an extension to the shell beyond the adjacent end of the cast metal liner.

3. The herein described method of making a brake drum which consists in providing a wrought steel cylindrical shell of relatively thin metal having an inturned continuous annular flange at one end and an outturned continuous annular flange spaced therefrom, shielding the outer side of the outturned flange, casting a liner of cast iron thicker than the thickness of the shell within the same between said first mentioned flange and the plane of the second flange, the temperatures of the shell and the molten iron cast thereinto being such as to provide a fusion connection between the liner and the shell, removing the shielding means and then shaping the outwardly extending annular flange into cylindrical form to provide a continuation of said shell beyond the adjacent end of the cast iron liner therein, and securing a back to the inwardly extending flange.

4. The herein described method of making brake drum parts which consists in providing a cylindrical shell of wrought metal, forming inturned flanges one at each end of the shell, forming an outwardly extending continuous annular rib around the shell substantially midway between its ends, said rib having two outwardly extending closely juxtaposed sides integrally connected by a bend, casting a cast metal liner within said shell and at the inner sides thereof between said inwardly extending end flanges, cutting through said liner midway between the ends thereof, and separating the two sides of the rib, as and for the purposes specified.

5. The method of making brake drums which consists of the steps recited in claim 4, and then permanently securing a web of wrought metal to each of the said inturned flanges.

6. The method consisting of the steps recited in claim 4, and then forming each of the sides of said ribs into cylindrical form as a continuation of the cylindrical shell beyond the adjacent end of the cast metal liner therein.

7. The herein described method of making brake drum parts which consists, in providing a cylindrical member of thin wrought steel with inturned annular flanges one at each end thereof, then forming an annular, outwardly extending continuous rib around said shell substantially midway between its ends, said rib having two outwardly extending closely positioned sides connected by an integral bend at their outer edges, heating and rotating the shell, depositing molten iron at high temperature within the shell and at the inner side thereof between said inturned end flanges, cooling and solidifying the molten metal, cutting through the same midway between its ends from its inner side outer to said shell, and then cutting away the bend joining the outer edges of the sides of said rib, as and for the purposes specified.

8. The method of making brake drums which method consists in providing a cylindrical shell from sheet metal and having at each of its sides an inwardly extending flange and substantially midway of the said flanges, an outwardly extending rib in the form of two closely spaced side walls joined at their outer diameter by a bend, heating the shell, revolving the shell and while revolving, casting therein a lining of iron, cutting said lining and the outwardly extending rib thereby separating said lined shell into two brake drums.

9. The method of making brake drums which method consists in providing a sheet steel cylindrical shell having at its sides inwardly extending flanges and substantially midway of said flanges an outwardly extending rib formed by two juxtaposed side walls and a bend, casting in the shell an iron lining, cutting the said bend whereby the shell and lining are separated into two annular portions and shaping the outwardly extending rib walls into cylindrical flanges.

10. The method of making brake drums which method consists in making a cylindrical shell from sheet steel, the said shell having an inwardly extending flange at one of its sides and an outwardly extending flange spaced therefrom, shielding the outwardly extending flange, casting in the shell an iron lining, and shaping the outwardly extending flange into cylindrical form.

CHARLES W. DAKE.
RAYMOND K. JOHNSON.